(12) United States Patent
Sharma

(10) Patent No.: US 7,379,754 B2
(45) Date of Patent: May 27, 2008

(54) RETENTION OF OLD MOBILE NUMBER ON SIM CARD REPLACEMENT

(75) Inventor: Vineet Sharma, Paris (FR)

(73) Assignee: Axalto S.A., Montrouge (FR)

( * ) Notice: Subject to any disclaimer, the term of this patent is extended or adjusted under 35 U.S.C. 154(b) by 14 days.

(21) Appl. No.: 10/531,821

(22) PCT Filed: Oct. 16, 2003

(86) PCT No.: PCT/IB03/04563

§ 371 (c)(1),
(2), (4) Date: Apr. 18, 2005

(87) PCT Pub. No.: WO2004/036942

PCT Pub. Date: Apr. 29, 2004

(65) Prior Publication Data

US 2006/0063564 A1  Mar. 23, 2006

(30) Foreign Application Priority Data

Oct. 18, 2002  (EP) ................... 02292574
Dec. 23, 2002  (EP) ................... 02293224

(51) Int. Cl.
*H04B 1/38* (2006.01)
(52) U.S. Cl. .................. 455/558; 455/410; 455/411; 455/551
(58) Field of Classification Search ............ 455/406, 455/407, 410, 411, 412.2, 415, 557, 558, 455/551; 380/248, 249
See application file for complete search history.

(56) References Cited

U.S. PATENT DOCUMENTS

2003/0050047 A1*  3/2003  Ala-Luukko ............ 455/412
2003/0092436 A1*  5/2003  Boivin ................... 455/419
2004/0235467 A1*  11/2004  Tuilier .................. 455/422.1
2005/0075137 A1*  4/2005  Reemtsma ............... 455/559

FOREIGN PATENT DOCUMENTS

| WO | WO-97/37506 A | 10/1997 |
| WO | WO-99/27730 A | 6/1999 |
| WO | WO-02/13564 A | 2/2002 |

OTHER PUBLICATIONS

Soner Oy (International Pub. No. WO-98/56201).*
PCT International Search Report; International Application No. PCT/IB03/04563 dated Feb. 5, 2004; (2 pages).

* cited by examiner

*Primary Examiner*—Duc M. Nguyen
*Assistant Examiner*—Dai Phuong
(74) *Attorney, Agent, or Firm*—Osha Liang LLP

(57) ABSTRACT

A method for managing phone numbers attribution after replacement of a first portable object (SCA) by a second portable object (SCB), the first portable object (SCA) being coupled to a communication device (CD) arranged to communicate with a network, the first portable object (SCA) including a first identification data ($IMSI_A$, $ADM_A$, $Ki_A$) identifying a first phone number ($MSISDN_A$). The method includes sending a message that includes a second identification data identifying a second phone number (MSISDNB) assigned to the second portable object (SCB) to an application server (AS); inserting the second portable object (SCB) into the communication device (CD), and subsequently sending a message (M2) for replacing, in the second portable object (SCB), the second identification data ($IMSI_B$, $ADM_B$, $Ki_B$) with the first identification data ($IMSI_A$, $ADM_A$, $Ki_A$).

11 Claims, 2 Drawing Sheets

RETENTION OF OLD MOBILE NUMBER ON SIM CARD REPLACEMENT

CROSS-REFERENCE TO RELATED APPLICATION

This application claims the benefit, pursuant to 35 U.S.C. §119, of Patent Cooperation Treaty Application No. PCT/IB03/04563 filed on Oct. 16, 2003, which claims priority of European Patent Application No. 02292574.7 filed Oct. 18, 2002 and European Patent Application No. 02293224.8 filed Dec. 23, 2002.

TECHNICAL FIELD

This invention relates, in general, to a communication system (and architecture thereof) and is particularly, but not exclusively, applicable to the management of the association of International Mobile Subscriber Identities (IMSIs) and Mobile Subscriber Integrated Service Digital Network (MSISDN) numbers for cellular communication system architecture.

The solution described in the following sections is targeted at improving the GSM activation process in cases where an existing GSM subscriber seeks to replace his SIM card, but wishes to retain his/her old mobile number.

Any type of communication device can be coupled with the SIM card. This communication device can be onboard or not. Note that an onboard system is for example a mobile telephone, an electronic assistant, a portable computer, etc. In the other hand, a system which is not onboard can be a personal computer (PC), a Point of Sale (POS), etc.

The Invention is not limited to SIM cards but can be extended to any emerging or future portable object whose use would be similar to that of the SIM card use.

In the below description, the example which will be used to illustrate the invention will be that of a smart card coupled to mobile phone.

PRIOR ART

A mobile number (MSISDN) is assigned to a SIM card (IMSI and Ki) in various elements of a GSM network. These network elements include, among others—Authentication Centre (AuC), Customer Care & Billing System (CCBS), Home Location Register (HLR), Mobile Switching Centre (MSC).

If an existing subscriber, for example identified by way of the following parameters ($MSISDN_A$, $IMSI_A$, $Ki_A$) seeks a SIM card replacement and at the same time wishes to retain his old mobile number, the new card details (say $IMSI_B$, $Ki_B$) have to be assigned to his old number ($MSISDN_A$).

Currently, re-assignment of old mobile number to a new SIM card is a cumbersome process involving manual intervention & processes on the part of the GSM operator. These manual processes imply wastage of effort, time and money. For the end user, the present process is inconvenient, as several manual checks have to be applied.

SUMMARY OF THE INVENTION

The proposed solution seeks to facilitate retention of old number in case of SIM card replacement.

According to one aspect of the invention, a method for managing phone numbers attribution after replacement of a first portable object (SCA) by a second portable object (SCB), the first portable object (SCA) being coupled to a communication device (CD) arranged to communicate with a network, the first portable object (SCA) comprising a first identification data ($IMSI_A$, $ADM_A$, $Ki_A$) identifying a first current phone number ($MSISDN_A$), comprises the following steps:

a first sending step, in which the communication device (CD) sends to an application server (AS) a message including a second identification data identifying a second phone number (MSISDNB) assigned to the second portable object (SCB);

an service-inserting step, in which the second portable object (SCB) is inserted in the communication device (CD), the second portable object (SCB) comprising a second identification data ($IMSI_B$, $ADM_B$, $Ki_B$) identifying the second phone number ($MSISDN_B$); and a second sending step, in which an application server (AS) sends a message (M2) for replacing, in the second portable object (SCB), the second identification data ($IMSI_B$, $ADM_B$, $Ki_B$) by the first identification data ($IMSI_A$, $ADM_A$, $Ki_A$).

With the invention, when the new card is inserted in the communication device, the new parameters attached to the new card are deleted/deactivated and replaced by the old parameters attached to the old card. So, we see that a user can keep his old phone number by way of a simple process.

IN THE DRAWINGS

DESCRIPTION OF AN EXAMPLE ILLUSTRATING THE INVENTION

Figure 1:
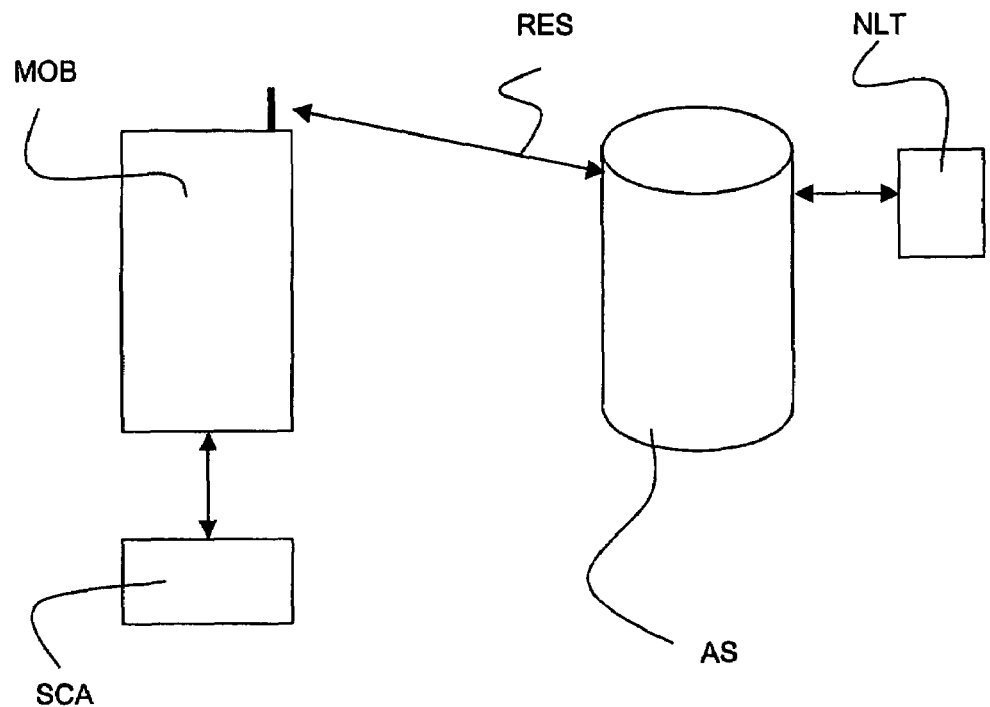
FIG. 1 is a diagrammatic view of the architecture to which the invention can be applied.
Figure 2:
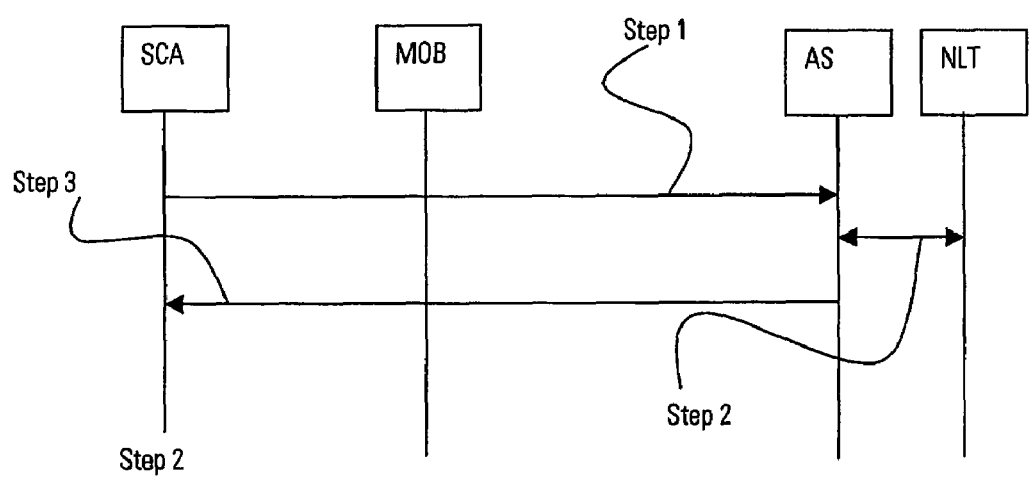
FIG. 2 illustrates the communication between the card to be replaced and the application server.
Figure 3:
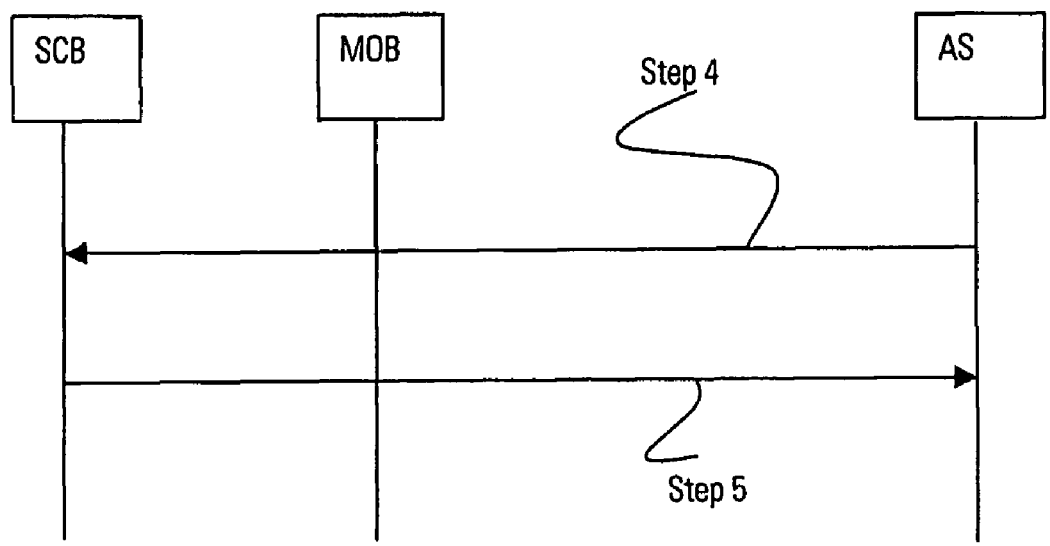
FIG. 3 illustrates the communication between the new card and the application server.

FIG. 1 represents an example of a system to which the invention can be applied.

In our example, the system comprises the following elements:
a card SCA
a card SCB
an application server AS.

In our example, initially, the card SCA is coupled to a mobile phone MOB. The mobile phone communicates with the application server AS by way of a network RES. In our example, the application server AS communicates with network elements NLT (HLR, AuC, Billing System, etc.).

In our example, the network RES is a GSM network. This example is not limitative; in another embodiment, for example if the communication device is a point of sale, the network could be Internet or a direct phone line.

In our example, a subscriber wishes to replace his SIM card SCA (with $IMSI_A$, $Ki_A$ assigned to $MSISDN_A$). The subscriber purchases (or is given by the operator under some promotion/loyalty scheme) a new SIM card SCB ($IMSI_B$, $Ki_B$). The new SIM card B, might (or might not) have an assigned mobile number ($MSISDN_B$). In any case, this solution envisages new cards with pre-assigned mobile numbers.

The subscriber wants to replace his old card SCA by his new card SCB without changing his phone number $MSISDN_A$.

The old card SCA includes, amongst other data,
the parameters $IMSI_A$ $Ki_A$ which enable access to the network,
ADM $Key_A$—administrative keys that allow update of data present in the card.

On the network (HLR, AuC, Billing System, etc.), $MSISDN_A$ is assigned to this card SCA.

The new card SCB, that the subscriber wants to use, includes amongst other data,
a couple $IMSI_B$ $Ki_B$ which enable access to the network, and ADM $Key_B$—administrative keys that allow update of data present in the card.

On the network (HLR, AuC, Billing System, etc.), the parameter $MSISDN_B$ is assigned to the new card SCB.

In our example, the application server AS incorporates OTA (Over The Air) functionalities, i.e., the mechanism to send an APDU (embedded in a special SMS) to the card. When the SIM card receives such a SMS, it is interpreted accordingly and the embedded APDU is implemented by the card's operating system. In the present case, the embedded instructions include—verify key, update file data, etc. The server AS also has a module to interface securely with network elements NLT (ex: HLR, Billing System, etc.) for getting details of cards SCA &SCB.

In our illustrated example, the process is the following (each step 1 to 4 is identified by a number which is also visible on FIG. 1). FIG. 1 illustrates the communication steps between the card SCA and the application server AS.

Step 1:

With card SCA in the mobile, the subscriber sends a SMS including the new mobile number ($MSISDN_B$) assigned to the new card SCB. The message is sent to a pre-defined number assigned to an Application server AS.

In our example, the subscriber simply goes to the "Messages" option on his/her mobile phone, types in a field the new parameter $MSISDN_B$, and sends the corresponding SMS to the number assigned to the Application server AS. All these steps could be printed on a brochure/flyer given along with new SIM card SCB, and the subscriber simply follows the instructions. Advantageously, some programs make sure that the user (who has bought the new card) is initiating the process, and that the new card SCB is a valid replacement card. Moreover, to get the details of the 2 cards on which the operation is to be performed.

Step 2:

Using information obtained from the origin ($MSISDN_A$) and the content ($MSISDN_B$) of the SMS, the application server AS requests the network for details corresponding to cards SCA and SCB. In our illustrated example, these details include the following sets of parameters ($IMSI_A$ $Ki_A$ ADM $Key_A$) and ($IMSI_B$ $Ki_B$ ADM $Key_B$) corresponding to $MSISDN_A$ and $MSISDN_B$, respectively.

Depending on the network architecture & data policy, the Application Server AS, could be interfaced with one or several network elements (HLR, Billing System, AuC). Or else, and if possible, the server AS could get details of SCA and SCB from a separate database managing SIM cards that is maintained by the operator for administrative purposes.

Step 3:

In our example, and for secure the transmission of data on the network, the Application server sends an encrypted SMS to MSISDNA (card SCA) which destroys the couple IMSIA/KiA in the card. Preferably, the message is encrypted in using ADM KeyA. More specifically, this would imply updating IMSI and Ki values with data that is impertinent to the network. For all practical purposes, this would render the card unusable.

On the subscriber side, the message could be: <<Now insert new card in handset.>>

Generally, in OTA messages, there are 3 levels of security
Signature (the sending entity should be acceptable by the card),
Encryption
and synchronization (there is an incrementing synchronization counter in the card, and the card will accept a special OTA message only if it contains the right synchronization count).

Depending on operator requirements, we could incorporate all or any of these features. Encryption is required particularly for end-to-end security. IMSI-Ki values being sensitive data, in our illustrated example, the operator might seek assurance on data integrity. On the card side, the necessary algorithm shall be embedded to allow processing (decryption) of encrypted messages received from the Application Server AS.

Before executing the following steps, the subscriber takes out the card SCA, and inserts the new card SCB in the phone.

Step 4

The new card SCB is not inserted in the phone MOB. In step 4, the subscriber now logs on to the network with the new mobile number (MSISDNB) assigned to the new card SCB.

Step 5

Using ADM KeyB, the Application server sends an encrypted message SMS to the new card SCB using the parameter $MSISDN_B$. This message updates the couple IMSIB/KiB values in the new card SCB with the old one IMSIA/KiA corresponding to the card SCA to be replaced. In our example, the parameters (ADM,KeyB) are also updated with the parameters (ADM,KeyA) corresponding to the old card SCA and subsequently the card is also <<refreshed>>. In our example, the parameters ADM key is updated to permit future, if any, OTA administration of the card.

In our implementation, the message sent to the new card SCB during step 5 is preferably sent during step 3, at the same time that the message is sent to card SCA. However, the new card SCB will receive the message only after it has been inserted in the mobile phone.

Step 6

In step 6, upon <<refresh >>, the mobile reads the updated values—$IMSI_A$ $Ki_A$, and logs on to the network with the old phone number ($MSISDN_A$).

In our illustrated example, ADM is updated. Nevertheless, this example is not limitative. Updating ADM is interesting for verifying the ADM key for updating files. Updating ADM can be avoided, by assigning old ADM key (of SCA) to new card SCB, on the network.

Generally, we have seen that during the service-information step, the communication device CD, while containing first smart card SCA, sends a message M1 to an application server AS, the message M1 including at least one parameter MSISDNB identifying the phone number assigned to second smart card SCB, which will be used to replace the first smart card SCA.

Before the service-inserting step, the application server AS sends a secure message M3 for deleting, in the first smart card SCA, parameters (IMSI$_A$, ADM$_A$, Ki$_A$) attached to the first phone number MSISDN$_A$. So that, we are sure that this couple won't be reuse by another user.

The message M3 is encrypted, the encryption being performed by using an encryption key (belonging to the set of keys ADM$_A$) attached to the first smart card SCA, and by using an algorithm that resides both on the Application Server AS, and on the smart card SCA.

In the same manner, we have seen that, for the service replacing step, the application server AS sends a secure message M3 to the new smart card SCB. The message M3 is encrypted, the encryption being performed by using an encryption key (belonging to the set of keys ADM$_B$) attached to the new smart card SCB, and by using an algorithm that resides both on the Application Server AS, and on the smart card SCB.

By this way, all the data transiting between the card and the application server are secure. Moreover, the use of the encryption keys stored in the card avoids adding supplementary keys in the card and in the application server.

We have also seen that, after the for the service using step, the communication device logs on to the network using said new smart card (SCB) and said old parameters (MSISDN$_A$, IMSI$_A$, ADM$_A$, Ki$_A$).

The invention also deals with an application server (AS) which comprises a program able to perform some steps.

a. A receiving step, in which the server receives a message from said first portable object SCA, said message requesting a replacement of said first portable object by the second portable object;

b. A sending step, in which the application server AS sends, after the user has inserted said second portable object in said communication device, a message M2 for replacing, in said second portable object SCB, parameters (IMSI$_B$, ADM$_B$, Ki$_B$) attached to the second phone number MSISDN$_B$ by parameters (IMSI$_A$, ADM$_A$, Ki$_A$) attached to the first phone number MSISDN$_A$;

The invention also deals with a portable object SCB comprising parameters (IMSI$_B$, ADM$_B$, Ki$_B$) attached to a phone number MSISDN$_B$ in particular a SIM card, characterized in that it comprises a microcontroller including a program for performing the following steps:

A receiving step in which said microcontroller receives a request for modifying some parameters (IMSI$_B$, ADM$_B$, Ki$_B$) attached to said phone number (MSISDN$_B$) by new parameters (IMSI$_A$, ADM$_A$, Ki$_A$) attached to another first phone number (MSISDN$_A$);

A using step, in which, once the parameters are modified, the portable object uses new parameters when communicating with the network e.g. with any data processing system able to communicate with the card, for example the application server AS.

In our example, we have seen that the messages are SMS messages. This example is not limitative; all kind of messages (MMS, etc.) can be used for implementing the invention.

We see now that the invention offers various advantages. All GSM operators could use the solution. In our illustrated example, the solution uses SMS for seamless mobile number retention. This makes it convenient for the user. He could do the SIM card replacement sitting at home. This solution also avoids modifying network components. All is performed using Over The Air (OTA) changes on the SIM card(s). Moreover, the invention is based on a secure message based process.

The invention claimed is:

1. A method for managing phone numbers attribution after replacement of a first portable object by a second portable object, the first portable object being coupled to a communication device arranged to communicate with a network, the first portable object comprising a first identification data identifying a first phone number, wherein the method comprises the following steps:

a first sending step, in which the communication device sends to an application server a message including a second identification data identifying a second phone number assigned to the second portable object, wherein before the first sending step, the application server sends a secure message for deleting, in the first portable object, the first identification data;

an inserting step, in which the second portable object is inserted in the communication device, the second portable object comprising a second identification data identifying the second phone number; and a second sending step, in which an application server sends a message for replacing, in the second portable object, the second identification data by the first identification data attached to the first phone number.

2. The method according to claim 1, wherein the method further comprises a using step, in which a user uses the second portable object with the first phone number.

3. The method according to claim 2, herein in the using step, the communication device communicates with the network using the second portable object, the first phone number and the first identification data.

4. The method according to claim 1, wherein the secure message is encrypted, the encryption being performed by using an encryption key attached to the portable object, and by using an algorithm that resides both on the Application Server, and on the portable object.

5. The method according to claim 1, wherein in the second sending step, the application server sends a secure message.

6. The method according to claim 5, wherein the secure message is encrypted, the encryption being performed by using an encryption key attached to the second portable object, and by using an algorithm that resides both on the Application Server, and on the second portable object.

7. The method according to claim 1, wherein the communication device is coupled to the first portable object during the first sending step; and wherein the communication device is coupled to the second portable object during the second sending step.

8. The method according to claim 1, wherein the first portable object is removed from the communication device prior to the inserting step.

9. An application server arranged to communicate with a communication device, the communication device being coupled to a first portable object, the first portable object comprising a first identification data identifying a first phone number the application server storing the first identification data wherein the application server comprises a computer program arranged to perform the following steps:

a receiving step, in which the application server receives from the communication device, a message including second identifying data identifying a second phone number assigned to a second portable object, wherein before the receiving step, the application server sends a secure message for deleting, in the first portable object, the first identification data and a sending step, in which the application server sends a message for replacing, in the second portable object, the second identification data by the first identification data, wherein the second sending step is configured to perform after the second portable object has been coupled to the communication device.

10. The application server according to claim 9, wherein the communication device is coupled to the first portable object during the receiving step; and wherein the communication device is coupled to the second portable object during the sending step.

11. The application server according to claim 9, wherein the first portable object is removed from the communication device prior to coupling the second portable object to the communication device.

* * * * *